US012771782B2

(12) United States Patent
Halme et al.

(10) Patent No.: US 12,771,782 B2
(45) Date of Patent: Oct. 20, 2026

(54) AUTOMATED FRAUD CALL DETECTION

(71) Applicant: Elisa Oyj, Helsinki (FI)

(72) Inventors: Marko Halme, Helsinki (FI); Pekka Aalto, Helsinki (FI); Tapio Hannula, Helsinki (FI); Timo Junninen, Helsinki (FI); Jukka Pietarinen, Helsinki (FI); Kalle Tomi, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/697,897

(22) PCT Filed: Dec. 14, 2022

(86) PCT No.: PCT/FI2022/050837
§ 371 (c)(1),
(2) Date: Apr. 2, 2024

(87) PCT Pub. No.: WO2023/170332
PCT Pub. Date: Sep. 14, 2023

(65) Prior Publication Data

US 2024/0422259 A1 Dec. 19, 2024

(30) Foreign Application Priority Data

Mar. 9, 2022 (FI) ..................................... 20225206

(51) Int. Cl.
*H04M 3/22* (2006.01)
*H04W 12/63* (2021.01)
*H04W 84/04* (2009.01)

(52) U.S. Cl.
CPC ......... *H04M 3/2281* (2013.01); *H04W 12/63* (2021.01); *H04M 2203/6027* (2013.01); *H04W 84/042* (2013.01)

(58) Field of Classification Search
CPC ....... H04W 4/24; H04W 12/06; H04W 64/00; H04W 4/90; H04W 4/02; H04W 12/12;
(Continued)

(56) References Cited

U.S. PATENT DOCUMENTS 5,566,234 A * 10/1996 Reed ..................... H04M 15/47
379/91.01
5,970,404 A * 10/1999 Foti ................... H04W 12/0431
455/433

(Continued)

FOREIGN PATENT DOCUMENTS

| | | |
|---|---|---|
| FI | 130228 B | 5/2023 |
| WO | 9730559 A1 | 8/1997 |
| WO | 2011080638 A1 | 7/2011 |

OTHER PUBLICATIONS

Finnish Patent and Registration Office, Communication of Acceptance, U.S. Appl. No. 20/225,206, dated Sep. 29, 2022, 5 pages.

(Continued)

*Primary Examiner* — Kwasi Karikari
(74) *Attorney, Agent, or Firm* — Ziegler IP Law Group, LLC.

(57) ABSTRACT

A computer-implemented method for automatically detecting a fraud call. A call request is received from a caller device to initiate a voice call with a called device at a local Public Land Mobile Network (PLMN). The call request is identified originating from a foreign Public Land Mobile Network (PLMN). In response to detecting that a caller ID of the caller device is associated to a local Public Land Mobile Network (PLMN), current location information is requested from a database of the local Public Land Mobile Network (PLMN). If the location information indicates the caller device is attached to the foreign Public Land Mobile Network (PLMN), determining the call request as authentic; and if the location information indicates the caller device is (Continued)

attached to the local Public Land Mobile Network (PLMN), determining the call request as fraud.

19 Claims, 2 Drawing Sheets

(58) Field of Classification Search
CPC ... H04W 12/63; H04W 88/06; H04W 84/042; H04W 4/029; H04W 12/126; H04W 12/08; H04W 60/00; H04W 24/08; H04W 8/04; H04W 40/20; H04W 64/003; H04W 8/20; H04W 24/04; H04W 4/025; H04W 12/65; H04W 48/14; H04W 12/10; H04W 12/64; H04W 8/205; H04W 12/128; H04W 12/02; H04M 2203/6027; H04M 3/2281; H04M 3/436; H04M 15/47; H04M 3/42059; H04M 15/00; H04M 7/0078; H04M 2215/0148; H04M 3/42042; H04M 2203/6045; H04M 3/2218; H04M 2203/551; H04M 3/5175; H04M 3/38; H04M 15/43; H04M 15/59; H04M 3/42102; H04M 2215/44; H04M 3/205; H04M 15/755
See application file for complete search history.

(56) References Cited

U.S. PATENT DOCUMENTS

| | | | | |
|---|---|---|---|---|
| 5,978,678 | A * | 11/1999 | Houde | H04W 8/12 455/433 |
| 6,438,355 | B1 | 8/2002 | Syed et al. | |
| 8,774,379 | B1 * | 7/2014 | Youngs | H04W 12/126 379/142.04 |
| 10,554,821 | B1 * | 2/2020 | Koster | H04M 3/436 |
| 2003/0112942 | A1 * | 6/2003 | Brown | H04M 15/00 379/196 |
| 2005/0070296 | A1 * | 3/2005 | Maanoja | H04W 8/10 455/456.1 |
| 2007/0072587 | A1 | 3/2007 | Della-Torre | |
| 2017/0013122 | A1 * | 1/2017 | Cohen | H04M 3/42017 |
| 2020/0053568 | A1 * | 2/2020 | Filart | H04L 63/1466 |
| 2021/0306453 | A1 | 9/2021 | Broadworth et al. | |

OTHER PUBLICATIONS

Finnish Patent and Registration Office, Text intended for Grant accompanying Communication of Acceptance mailed Sep. 29, 2022, U.S. Appl. No. 20/225,206, 20 pages.
Moosedog Oy, Claims accompanying Reply to Communication of Acceptance; dated Oct. 17, 2022 for U.S. Appl. No. 20/225,206 , 3 pages.
Moosedog Oy, Marked up claims accompanying Reply to Communication of Acceptance; dated Oct. 17, 2022 for U.S. Appl. No. 20/225,206 , 3 pages.
Moosedog Oy; Reply to Communication of Acceptance dated Sep. 29, 2022, U.S. Appl. No. 20/225,206, dated Oct. 17, 2022, 1 page.
European Patent Office, The International Search Report and Written Opinion of the International Searching Authority, Application No. PCT/FI2022/050837, mailed Feb. 27, 2023, 13 pages.
Finnish Patent and Registration Office, Patent granted, U.S. Appl. No. 20/225,206, mailed May 3, 2023, 2 pages.
Finnish Patent and Registration Office, Search Report, U.S. Appl. No. 20/225,206, mailed Sep. 29, 2022, 2 pages.

* cited by examiner

AUTOMATED FRAUD CALL DETECTION

TECHNICAL FIELD

The present disclosure generally relates to automated fraud call detection.

BACKGROUND

This section illustrates useful background information without admission of any technique described herein representative of the state of the art.

Number spoofing in calls from abroad has grown to a major problem. Number or caller ID spoofing means a practice where scammers change their caller ID to disguise the true origin of the call. The number of scam calls has continued to increase lately. People lose millions to fraudsters in technical support call scams, for example. Number spoofing typically involves calls made from abroad. The practice is not an issue in calls made internally.

Within networks, telecommunications operators are required to ensure that numbers are authentic and correct, but it is currently practically impossible to identify the caller in incoming international calls and to verify whether the caller has the right to use the local phone number in question.

A solution is needed to prevent the caller's number from being changed to mimic a local number. This enables operators to ensure that a number belongs to a customer with a subscription and the right to use the number in question. Call recipients, on the other hand, can trust that calls from local numbers are truly made from local subscriptions. Moreover, customers with a local telephone subscription and number can trust that their telephone numbers will not be used to commit crimes.

Currently known solutions have a problem that a calling party number shown to a called party for incoming calls may be spoofed/fraudulent. Spoofed calling party numbers may be used for criminal purposes to cheat the called party to answer the call, believing that the call comes from a legal source. Once the called party answers the call, an illegal caller may continue the fraud, e.g., mislead the called party to provide confidential information.

It is therefore desired to automatically detect calling party fraud to provide improved security, reduce human errors, and to render the service provider system more scalable.

SUMMARY

The appended claims define the scope of protection. Any examples and technical descriptions of apparatuses, products and/or methods in the description and/or drawings background art or examples useful for understanding the invention.

According to a first example aspect there is provided a computer-implemented method for automatically detecting a fraud call, comprising:

- receiving a call request from a caller device to initiate a voice call with a called device at a local Public Land Mobile Network (PLMN);
- identifying the call request originating from a foreign Public Land Mobile Network (PLMN);
- in response to detecting that a caller ID of the caller device is associated to a local Public Land Mobile Network (PLMN), requesting current location information from a database of the local Public Land Mobile Network (PLMN); and

- if the location information indicates the caller device is attached to the foreign Public Land Mobile Network (PLMN), determining the call request as authentic; and
- if the location information indicates the caller device is attached to the local Public Land Mobile Network (PLMN), determining the call request as fraud.

In an embodiment, identifying the call request to be originating from the foreign Public Land Mobile Network (PLMN) is based on the call request received from a roaming platform.

In an embodiment, the database of the local Public Land Mobile Network (PLMN) comprises a Home Location Register (HLR).

In an embodiment, the requesting current location comprises triggering a CAMEL protocol AnyTimeInterrogation (ATI) query to the Home Location Register (HLR) of the caller device.

In an embodiment, the method further comprises:

- receiving, in response to the triggered query, an AnyTimeInterrogation (ATI) result
- configured to indicate a Visitor Location Register (VLR) of the caller device.

In an embodiment, the current location information is requested from a Home Location Register (HLR) of the caller device and the current location information comprises a Visitor Location Register (VLR) of the caller device.

In an embodiment, if the Visitor Location Register (VLR) is located in foreign country in view of the local Public Land Mobile Network (PLMN), the call request is determined to be authentic; and if the Visitor Location Register (VLR) is located in same country in view of the local Public Land Mobile Network (PLMN), the call request is determined to be fraud.

In an embodiment, the method further comprises:

- receiving, in response to the triggered query, a failure code; and
- determining the call request to be authentic or fraud based on the failure code.

In an embodiment, the method further comprises:

- in response to determining the call request as authentic, connecting the voice call further to the called device.

In an embodiment, the method further comprises:

- in response to determining the call request as fraud, preventing the voice call to the called device or connecting the voice call further to the called device with calling number presentation restriction on.

In an embodiment, the method further comprises in response to determining the call request as fraud, selecting at least one of the following:

- releasing the voice call with various release causes leading to different tones and/or announcements played to the calling device;
- connecting the voice call to automatic announcements played to the calling device; and
- connecting the voice call to with and endless ringing tone.

In an embodiment, the method further comprises maintaining a list of individual numbers or number ranges indicating caller IDs from which calls requests are always allowed.

In an embodiment, the method further comprises triggering the ATI query to other operator's HLRs, wherein the operator applies a proxy service via which the ATI query is routed, and the proxy service is configured to limit items allowed to be queried and results allowed to be returned.

According to a second example aspect there is provided an apparatus comprising at least one memory and at least one processor collectively configured to cause performing the method of the first example aspect.

According to a third example aspect there is provided a computer program comprising computer executable program code which when executed by at least one processor causes an apparatus at least to perform the method of the first example aspect.

According to a fourth example aspect there is provided a computer program product comprising a non-transitory computer readable medium having the computer program of the third example aspect stored thereon.

According to a fifth example aspect there is provided an apparatus comprising means for performing the method of any preceding aspect.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Figure 1:
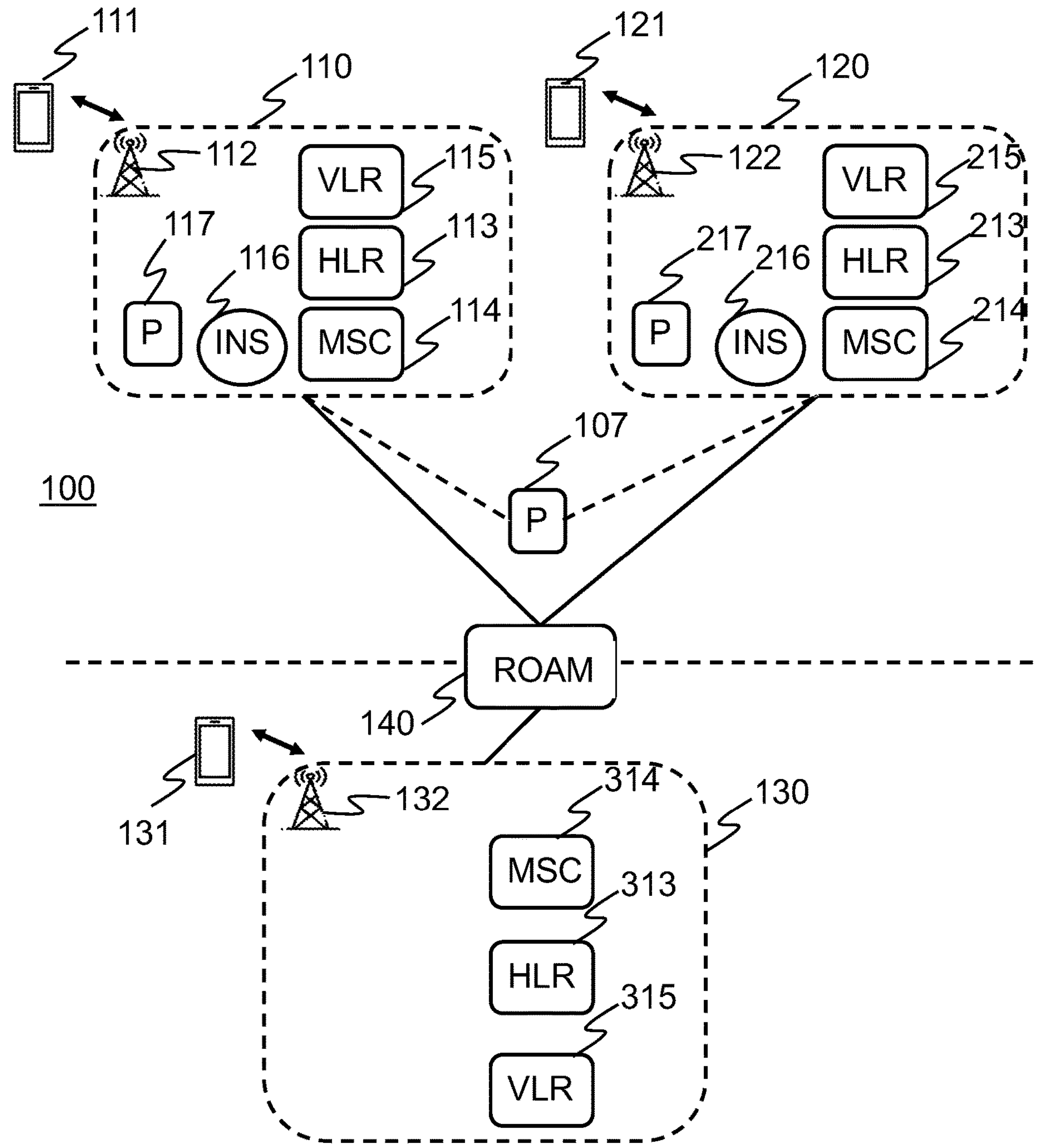
FIG. 1 shows a block diagram illustrating an example of communications environment according to an example embodiment.

FIG. 1 shows a block diagram illustrating an example of communications environment 100 in which fraud calls can be terminated to a mobile device. In communications environment 100 illustrated in FIG. 1, one or more communications networks such as a first local Public Land Mobile Network (PLMN) 110; a second local Public Land Mobile Network (PLMN) 120; and a foreign Public Land Mobile Network (PLMN) 130 are shown, and customers may use mobile devices 111, 121, 131 (e.g., a cell phone, smartphone, or advanced mobile device) to connect to local and foreign networks 110, 120, 130.

Communications environment 100 includes base transceiver stations (BTS) 112, 122, 132, a roaming platform 140, Home Local Registers (HLR) 113, 213, 313, mobile switching centres (MSC) 114, 214. These components can communicate directly or indirectly via networks 110, 120, 130, and roaming platform 140. Although only selected components are shown, one with ordinary skill in the art will appreciate that there can be several components and that those components can be located in any of the networks.

Networks may be comprised of a combination of networks including Public Switched Telephone Networks (PSTNs), interconnected via gateways operable to facilitate communications between and among various networks. Also, networks can include a GSM mobile communications network, a code/time division multiple access (CDMA/TDMA) mobile communications network, a 3rd, 4th or 5th generation (3G/4G/5G) mobile communications network (e.g., General Packet Radio Service or Enhanced General Packet Radio Service (GPRS/EGPRS)), Enhanced Data rates for GSM Evolution (EDGE), Universal Mobile Telecommunications System (UMTS), or Long Term Evolution (LTE) network, or other communications network, Personal Communications Service (PCS), Digital Advanced Mobile Phone Service (D-Amps), Bluetooth, Wi-Fi, or Fixed Wireless Data. These networks may use protocols such as TCP/IP, UDP, RTSP, extensible messaging and presence protocol (XMPP), real time messaging protocol (RTMP), instant messaging and presence protocol (IMPP), instant messaging, USSD, IRC, or any other wireless data networks or messaging protocols. Networks (and components of these networks) may also include wired communication and wired networks. Also, one with ordinary skill in the art will understand that there may be several roaming networks, all of which may connect to roaming platform 140.

As shown in FIG. 1, communications environment 100 may include base transceiver stations (BTS) 112, 122, 132, each of which is a piece of equipment that facilitates wireless communication between a mobile device user and a network. Roaming platform 140 may be a combination of hardware and software components. The hardware can include one or more computing devices with processors, memory, communication devices, and databases that can interact with local network and foreign network and the components of each network. Also, one with ordinary skill in the art will appreciate that roaming platform 140 can be used for several networks, each being identified by an IMSI of a mobile device, for example.

Roaming platform 140 may be capable of updating the location of a roaming mobile device with both the home network and roaming network. The location can refer to the network in which the mobile device is located, or it can refer to which MSC is able to directly connect with the mobile device. The location can be a logical location (e.g., a numerical address or digits). Also, a network owner may modify roaming platform 140 to have a different fixed value or a fixed value that indicates certain information (e.g., a combination of letters and numbers and other logical identifiers). For example, roaming platform 140 could send a fixed value in Message Application Part (MAP) layer in a send-routing-information to a MSC or HLR when a subscriber is roaming. Roaming platform 140 can then send the location update information to HLR in the home network, which will update a HLR entry to reflect the location update.

Roaming platform 140 may also implement features required for fully functional dual-IMSI or multi-IMSI roaming service delivery. For example, roaming platform 140 may provide processing of location management, subscriber management, authentication management and call handling MAP. In some embodiments roaming platform 140 may also process customized applications for mobile networks enhanced logic traffic (CAMEL), SMS and unstructured supplementary service data (USSD) transactions, signalling connection control part (SCCP) protocol, Global Titles (GT) subsystems, global titles translation (GTT) functionality, mobile station roaming number (MSRN) modification for inbound roamers, IMSI modification for outbound roamers, CAP (CAMEL) parameters modification for outbound roamers, and other standard interfaces and protocols.

Roaming platform 140 may be an International Gateway switch that is configured to assist in dealing with country codes in its translations, so 44 will route to UK, 55 to France etc. and deliver the digits required for local routing in the destination exchanges, for example.

The roaming platform 140 may be an edge agent such as a Diameter routing agent (DRA) deployed at the network edge and functions as the edge agent. On an IPX network, the edge agent must be deployed to support route addressing for Diameter signalling between the visited and home networks.

The edge agent 140 may be mainly used for route addressing and forwarding of Diameter signalling, including mobility management, charging policy, and charging information about internationally roaming subscribers, transmitted over S6a, S6d, and S9 interfaces, for example. When the edge agent is deployed as a unified Diameter signalling gateway, all signalling messages are transmitted through the edge agent. This allows an operator network to only send or receive signalling messages to or from edge agents deployed on other operator networks. It no longer needs to learn the internal structure of other networks. In addition, its network architecture is not provided to others.

HLR 113, 213, 313 may be a database containing data regarding customers (e.g., subscribers) authorized to use a network (e.g., home network 110). In some embodiments, when a new subscriber is added to the system, the network provider (e.g., MNO) can enter the subscriber's information into HLR 113. MSC 114 can access HLR 113, and home network 110 may contain more than one HLR (not shown). Some of the information stored in an HLR 113 includes the International Mobile Subscriber Identity (IMSI) and the Mobile Station International Subscriber Directory Number (MSISDN) of each subscriber (e.g., MNO or MVNO customer). HLR 113 can use IMSIs to identify each subscriber, and IMSIs serve as a key for each HLR 113 record. Other information stored in HLR 113 can include services requested by or rendered to the corresponding subscriber, settings of the subscriber, the current location of the subscriber and call divert settings. Similar properties apply for other HLRs 213, and 313 too.

MSC 114 and MSC 214. 314 may switch data packets from one network path to another (e.g., routing). For example, MSC 314 may be used to access the public switched telephone networks (PTSNs) to route messages or incoming calls to mobile device 131. MSCs may also provide information that is needed to support mobile service subscribers, such as registration and authentication. MSC 314 may handle the voice traffic for roaming network 130 and MSC 114 may handle the voice traffic for home network 110. Depending on the MNO, MSC 314 may be connected to a visited local register VLR 315, and MSC 314 may communicate with a VLR 315. MSC 314 and MSC 114, 214 may support a wide range of protocols including: RANAP, BSSAP, N-ISUP, SIGTRAN, BICC, MAP, CAP, INAP, SIP, and GCP. One with ordinary skill in the art will appreciate that MSC 314 and MSC 114, 214 can support other protocols and standards used in wireless networks. Also, one with ordinary skill in the art will appreciate that while MSC 314 and MSC 114, 214 are shown in FIG. 1, there can be several MSCs and these MSC 114, 214, 314 (and additional MSCs) can communicate with components of home network 110, other local network 120 or roaming foreign network 130.

Various components of the disclosed technology may be utilized to handle a location update for a mobile device, which may be used in routing voice calls. The sequence may include called mobile device 111, home MSC 114, home HLR 113, a visiting location register (VLR) 315, roaming foreign network 130, home local network 110, roaming platform 140, foreign MSC 314 and HLR 313. One with ordinary skill in the art will appreciate that VLR 315 and MSC 314 can be communicably coupled. Also, whether a MSC 314 or VLR 315 or a combination of is used in a location update process depends on how the MNO is setup. In this disclosure, as an example, MSC 314 and VLR 315 handle the location update. Also, VLR 315 maintains temporary mobile device user information to manage requests from customers who are out of the area covered by their home system. VLR 315 data is temporary data which exists for only as long as the customer is active in the particular area covered by the VLR 315. While one VLR is shown, the system may include several VLRs. Local home network's 110 HLR 113 may maintain location of a location of a mobile device when roaming. For example, id or location of the VLR 315 may be maintained at HLR 113 when the mobile device 131 roams from home local network 110 to foreign network 130. Local networks 110, 120 may also comprise VLRs 115, 215 to maintain information on visiting subscribers.

FIG. 1 schematically shows an example scenario according to an embodiment. The scenario shows a local Public Land Mobile Network (PLMN) 110 wherein a call request is received from a caller device 121, 131 to initiate a voice call with a called device 111 at a local Public Land Mobile Network (PLMN) 110.

The call request may be identified originating from a foreign Public Land Mobile Network (PLMN) 130 by a roaming platform 140 as an international trunk call from a foreign PLMN. Additionally, or alternatively, a first local network 110, 120 that receives the foreign call request may mark the call as international call by setting a prefix with a foreign country service ID.

In response to detecting that a caller ID of the caller device 121, 131 is associated to a local Public Land Mobile Network (PLMN) 110, 120, current location information is requested from a database 113, 213 of the local Public Land Mobile Network (PLMN) 110, 120. The database of the local Public Land Mobile Network (PLMN) may comprise a Home Location Register (HLR), for example.

If the location information indicates the caller device 121, 131 is attached to the foreign Public Land Mobile Network (PLMN) 130, the call request may be determined as authentic. If the location information indicates the caller device 121, 131 is attached to the local Public Land Mobile Network (PLMN) 110, 120, the call request may be determined as fraud.

In an embodiment, caller ID can be used to determine origin of the caller. When determining that caller ID digits indicate caller from a certain country and when the caller ID digits do not belong to unused subspace, a call transfer request can be made for the caller ID. Such request may further indicate the network operator of the caller ID subscription.

Request for current location may then be sent to the indicated network operator. The request for current location may comprise triggering a CAMEL protocol AnyTimeInterrogation (ATI) query to the Home Location Register (HLR) 113, 213, 313 of the caller device 121, 131, for example.

In response to the triggered query, an AnyTimeInterrogation (ATI) result may be received and configured to indicate a Visitor Location Register (VLR) 115, 215, 315 of the caller device 121, 131.

In response to the triggered query, a failure code may be received, and the call request determined to be authentic or fraud based on the failure code. For example, failure codes indicating that an active subscription (for caller ID) does not exist, such as "UnknownSubscriber", "IllegalSubcsriber" or UnidentifiedSubscriber" may indicate a fraud call.

Also failure codes indicating that location information is not available, or the information is uncertain. Such failure codes may be "imsiDetached" or "absentSubscriber" that state that the subscription is not attached to network (no matter it is calling) but such failure codes may exist in network due to operational problems. In such cases the call may be accepted but the caller ID may be changed to "unknown" to point out possible fraud for the called party.

The current location information may be requested from a Home Location Register (HLR) of the caller device 121, 131 and the current location information identifies a Visitor Location Register (VLR) 115, 215, 315 of the caller device 121, 131.

In an embodiment, if the identified Visitor Location Register (VLR) 115, 215, 315 is located in foreign country in view of the local Public Land Mobile Network (PLMN) 110, the call request is determined to be authentic; and if the Visitor Location Register (VLR) is located in same country in view of the local Public Land Mobile Network (PLMN), the call request is determined to be fraud.

For basic subscription, if VLR address is determined to be in local (home) country but call is coming from abroad (e.g. international trunk) according to roaming platform, it typically refers to a fraud call. However, operators may have additional services for subscriptions, such as multi-SIM service, where the VLR address may be given as VLR address of the main SIM. Thus, the parallel SIM, at least in theory, can be located in foreign country and incoming call thus authentic no matter main SIM is located in local country. In such cases the call may be accepted but the caller ID may be changed to "unknown" to point out possible fraud for the called party.

In an embodiment, an Intelligent Network Service (INS) 116, 216 is configured to control automated detection of fraud calls. The Intelligent Network Service (INS) 116, 216 is configured to implement at least some example embodiments of present disclosure.

According to embodiments, following steps may be controlled by the INS 116, 216, for example. Not all steps are mandatory and additional steps may be included.

1) Monitor the calls coming from abroad (e.g. based on roaming platform 140) and trigger such calls to the IN Service 116, 216.
2) The IN service 116, 216 analyses if the calling party number is a local mobile number
    2.1) Study the operator of the calling party 121, 131 and decide whether to handle the call in the service or not; and/or
    2.2) Study the operator of the called party 111 and decide whether to handle the call in the service 116 or not.
3) If the calling party 121, 131 is a local mobile number (and if it is in a scope that can be checked) the IN service 116 makes CAMEL protocol AnyTimeInterrogation (ATI) query to the home location register (HLR) 113, 213 of the calling number 121.
    3.1) The content of the ATI query is set so that the required result can be received.
4) The HLR 113, 213 returns the ATI-result that indicates the visited location register (VLR) 115, 215, 315 of the calling party number. The result may also contain various failure codes (ReturnError codes).
5) The IN service 116 checks if the VLR 115, 215, 315 is in local country or abroad or what is the possible failure code.
6) In case the VLR 315 is abroad, the call is considered OK and can be connected further.
7) In case the VLR 115, 215 is in local country, the call is considered to be a possible fraud call with spoofed calling party number. Such call is coming from abroad but the VLR 115, 215 indicates that the calling number/subscriber is not roaming abroad. Note: there are some specific cases e.g., based on customer's services where the location cannot be verified; in such cases the IN service 116 can have options e.g. to allow the call as such or to set the calling party number presentation restriction.
8) In case the result contains a failure code, the IN service 116 decides the call processing based on the failure code.
9) In case the call is considered as a possible fraud call the IN service 116 decides whether to:
    9.1) Prevent the call connection to the called number
    9.2) Connect the call to the called number, but set the calling number presentation restriction on (e.g. "unknown").
10) In case the call connection is prevented, the IN service 116 may also "cheat the cheater" by handling the call randomly in the following way: (Background: if there would be a regular way to prevent the call, the illegal caller would more easily notice that the call has been identified as a fraud call and thus move forward to try the next victim.)
    10.1) Release the call with various release causes leading to different tones/announcements played to the calling user.
    10.2) Connect the call to various announcements.
    10.3) Connect the call to endless ringing tone.

Releasing the call means that call is cleared instead of connecting it to the called party or to any "cheat the cheater" functionality.

When releasing the call, a release code may be attached to the release command used for the releasing within the network. Typically, the closest exchange or switching center to the caller party interprets the release code and determines the tone or message provided to the caller.

The IN service 116 may also contain White Lists indicating individual numbers or number ranges indicating numbers from which the calls are always allowed.

In an embodiment, a call request is received from a caller device 121 to initiate a voice call with a called device 111 at a local Public Land Mobile Network (PLMN) 110. The call request is identified originating from a foreign Public Land Mobile Network (PLMN) 130 and the IN Service is triggered. In response to detecting that a caller ID of the caller device 121 is associated to a local Public Land Mobile Network (PLMN) 120, current location information (VLR location) is requested from a database (HLR 213) of the local Public Land Mobile Network (PLMN) 120.

When making ATI queries to other operators HLRs 213 (in case the calling number belongs to another operator) the operators may apply a proxy service 117, 217 via which the ATI queries may be routed. For example, the INS 116 may send a query to the proxy 217 of another operator network 120. The proxy 217 can limit the items that can be queried and results that will be returned, to protect operators from passing unnecessary information between operator networks 110, 120. The proxy 217 can also contain White Lists indicating individual numbers or number ranges indicating numbers from which the calls are always allowed.

Corresponding proxies 117, 217 may be provided by each operator network for responding to external queries from other INSs 116, 216.

Additionally, or alternatively, a common proxy 107 may be provided serving a plurality of different INSs 116, 216 from different networks 110, 120, 130. A combination of common proxy 107 and operator network 110, 120 proxies 117, 217 may also be provided.

If the location information (e.g. VLR location 315) indicates the caller device 131 is attached to the foreign Public Land Mobile Network (PLMN) 130, the call request may be determined as authentic; and if the location information (e.g. VLR location 115, 215) indicates the caller device 121 is attached to the local Public Land Mobile Network (PLMN) 110, 120, the call request may be determined as fraud.

Examples of commonly used call scams using fraud calls:

1) technical support scam calls in which fraudsters pretend to be calling from an IT company to help the victim deal with an urgent information security issue;
2) customer service calls from a bank in which fraudsters impersonate bank personnel and pretend to help the victim deal with online banking issues.

Figure 2:
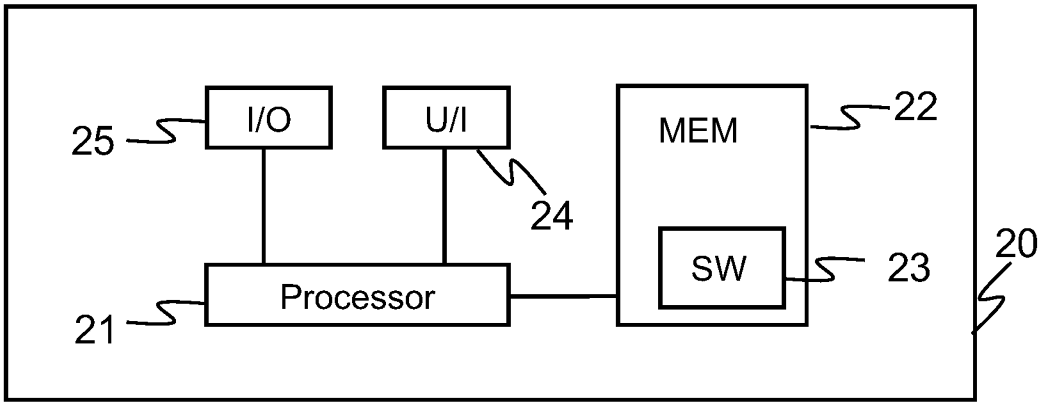
FIG. 2 shows a block diagram of an apparatus according to an embodiment.

FIG. 2 shows a block diagram of an apparatus 20 according to an embodiment. The apparatus 20 is for example a general-purpose computer or server or some other electronic data processing apparatus. The apparatus 20 can be used for implementing at least some embodiments of present disclosure. That is, with suitable configuration the apparatus 20 is suited for operating for example as the Intelligent Network Service 116, 216 of FIG. 1.

The apparatus 20 comprises a communication interface 25; a processor 21; a user interface 24; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

The user interface 24 is configured for providing interaction with a user of the apparatus. Additionally, or alternatively, the user interaction may be implemented through the communication interface 25. The user interface 24 may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data, or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like.

Figure 3:
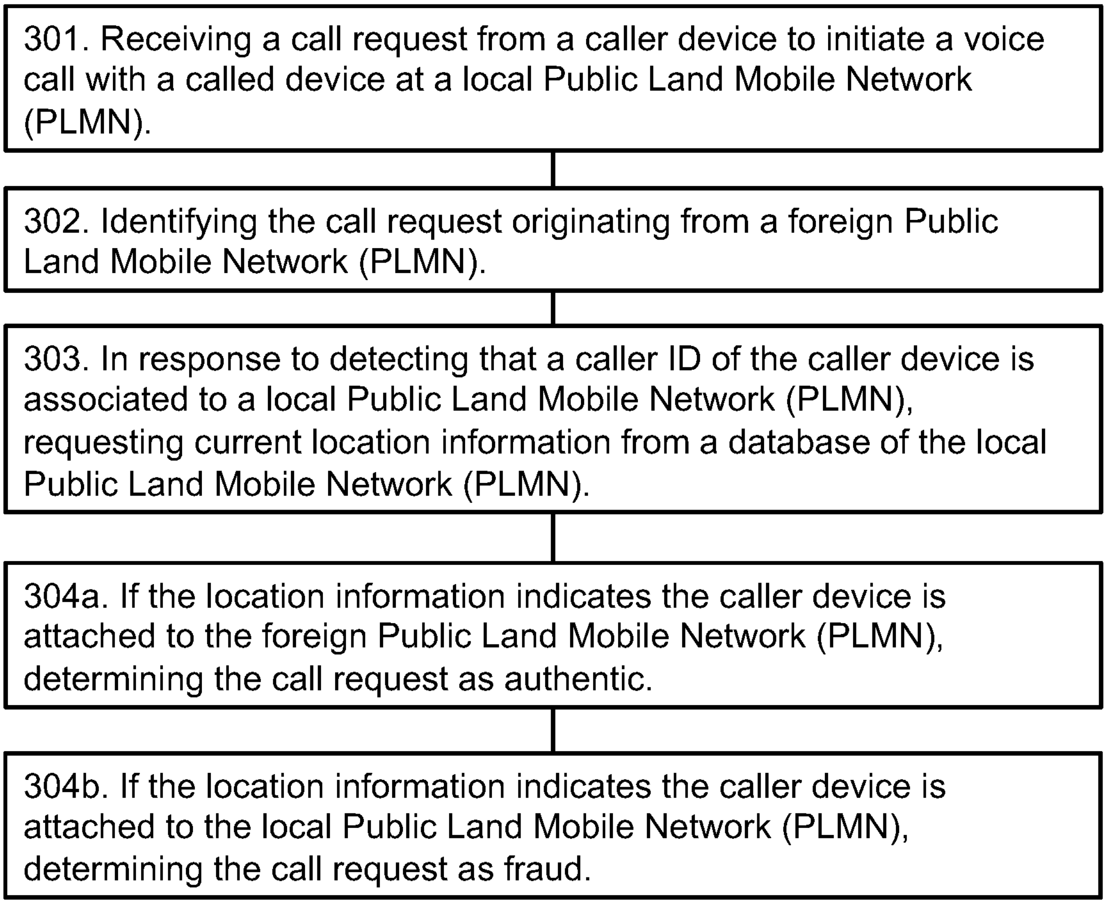
FIG. 3 shows a flow chart according to an example embodiment.

FIG. 3 shows a flow chart according to an example embodiment. FIG. 3 illustrates a process comprising various possible steps including some optional steps while also further steps can be included and/or some of the steps can be performed more than once. The process may be implemented in the networks 110, 120, 130 of FIG. 1, in the Intelligent Network Service 116, 216 of FIG. 1 and/or in the apparatus 20 of FIG. 2. The process is implemented in a computer program code and does not require human interaction unless otherwise expressly stated. It is to be noted that the process may however provide output that may be further processed by humans and/or the process may require user input to start. The process comprises the following phases:

301: A call request is received from a caller device to initiate a voice call with a called device at a local Public Land Mobile Network (PLMN).

302: The call request is identified originating from a foreign Public Land Mobile Network (PLMN).

303: In response to detecting that a caller ID of the caller device is associated to a local Public Land Mobile Network (PLMN), current location information is requested from a database of the local Public Land Mobile Network (PLMN).

304*a*: If the location information indicates the caller device is attached to the foreign Public Land Mobile Network (PLMN), the call request is determined as authentic.

304*b*: If the location information indicates the caller device is attached to the local Public Land Mobile Network (PLMN), determining the call request as fraud.

Without in any way limiting the scope, interpretation, or application of the appended claims, a technical effect of one or more of the example embodiments disclosed herein is clearly defined mechanism for automatically detecting fraud calls.

A further technical effect of some embodiments is ability to distinguish whether an incoming call may be fraud.

A further technical effect of some embodiments is ability to automatically control possible fraud calls using various responding options.

A further technical effect of some embodiments is that end customers (called parties) can trust that the call is really coming from the presented calling party numbers and illegal calls are either prevented totally or the illegal and thus misleading calling number is not shown.

A further technical effect of some embodiments is that illegal calls with spoofed calling party number are expected to eventually end or decrease, because the criminals will not get expected results.

A further technical effect of some embodiments is that it provides methods to identify illegal calls with spoofed calling party numbers and to handle the call connection in a way that protects the called party.

A further technical effect of some embodiments is that incoming calls from abroad are studied, and it is verified if the calling number/party is really roaming abroad or not. If it is not roaming, but the call comes from abroad, the call can be considered fraudulent, and the service described in the invention can decide the actions how to handle the call.

Any of the afore described methods, method steps, or combinations thereof, may be controlled or performed using hardware; software; firmware; or any combination thereof. The software and/or hardware may be local; distributed; centralised; virtualised; or any combination thereof. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer-implemented method for automatically detecting a fraudulent call request, the method consisting of:

receiving a call request from a caller device to initiate a voice call with a called device at a local Public Land Mobile Network (PLMN);

identifying that the call request originates from a foreign country Public Land Mobile Network (PLMN) based on the call request being received from a roaming platform, wherein the roaming platform is a network entity distinct from and arranged between the local Public Land Mobile Network (PLMN) and the foreign country Public Land Mobile Network (PLMN) for handling international roaming signalling and routing;

in response to detecting that a caller ID of the caller device is associated to the local Public Land Mobile Network (PLMN), requesting current location information from a database of the local Public Land Mobile Network (PLMN), and if the location information indicates the caller device is attached to the foreign Public Land Mobile Network (PLMN), determining the call request as authentic; and if the location information indicates the caller device is attached to the local Public Land Mobile Network (PLMN), determining that the call request is fraudulent.

2. The method of claim 1, wherein the database of the local Public Land Mobile Network (PLMN) comprises a Home Location Register (HLR).

3. The method of claim 2, wherein the requesting current location comprises:

triggering a CAMEL protocol AnyTimeInterrogation (ATI) query to the Home Location Register (HLR) of the caller device.

4. The method of claim 3, further comprising:

triggering the ATI query to other operator's HLRs, wherein the operator applies a proxy service via which the ATI query is routed, and the proxy service is configured to limit items allowed to be queried and results allowed to be returned.

5. The method of claim 3, further comprising:

receiving, in response to the triggered query, an AnyTimeInterrogation (ATI) result configured to indicate a Visitor Location Register (VLR) of the caller device.

6. The method of claim 3, further comprising:

receiving, in response to the triggered query, a failure code; and determining the call request to be authentic or fraud based on the failure code.

7. The method of claim 1, wherein the current location information is requested from a Home Location Register (HLR) of the caller device and the current location information comprises a Visitor Location Register (VLR) of the caller device.

8. The method of claim 7, wherein if the Visitor Location Register (VLR) is located in foreign country in view of the local Public Land Mobile Network (PLMN), the call request is determined to be authentic; and if the Visitor Location Register (VLR) is located in same country in view of the local Public Land Mobile Network (PLMN), the call request is determined to be fraud.

9. The method of claim 1, further comprising in response to determining the call request as authentic, connecting the voice call further to the called device.

10. The method of claim 1, further comprising in response to determining the call request as fraud, preventing the voice call to the called device or connecting the voice call further to the called device with calling number presentation restriction on.

11. The method of claim 1, further comprising in response to determining the call request as fraud, selecting at least one of the following:

releasing the voice call with various release causes leading to different tones and/or announcements played to the calling device;

connecting the voice call to automatic announcements played to the calling device; and connecting the voice call to with and endless ringing tone.

12. The method of claim 1, further comprising maintaining a list of individual numbers or number ranges indicating caller IDs from which calls requests are always allowed.

13. An apparatus comprising means for performing the method of claim 1.

14. A non-transitory computer-readable medium storing computer executable program code that, when executed by one or more processors of an apparatus causes the apparatus to perform the method of claim 1.

15. The method of claim 1, wherein the requesting of the current location information is triggered by detecting a signaling inconsistency between:

(i) the call request being identified as originating from the foreign country Public Land Mobile Network (PLMN); and (ii) the caller ID of the caller device being associated with the local Public Land Mobile Network (PLMN).

16. The method of claim 1, wherein the determining that the call request is authentic or fraudulent is based on a current attachment state of the caller device.

17. A computer-implemented method for automatically detecting a fraudulent call request, the method comprising:

receiving a call request from a roaming platform associated with a foreign-country Public Land Mobile Network (PLMN) to initiate a voice call with a called device at a local Public Land Mobile Network (PLMN);

identifying that a caller ID of the call request is associated with the local Public Land Mobile Network (PLMN);

in response to determining that the call request originates from the foreign-country Public Land Mobile Network (PLMN) while the caller ID is associated with the local Public Land Mobile Network (PLMN), triggering a CAMEL protocol AnyTimeInterrogation (ATI) query to a Home Location Register (HLR) of the caller device to obtain current location information for the caller device;

if the current location information indicates that the caller device is attached to the foreign-country Public Land Mobile Network (PLMN), determining that the call request is authentic; and if the current location information indicates that the caller device is attached to the local Public Land Mobile Network (PLMN), determining that the call request is fraudulent.

18. The method of claim 17, wherein the CAMEL protocol AnyTimeInterrogation (ATI) query is triggered based on detecting a signaling inconsistency between:

(i) the call request originating from the foreign-country Public Land Mobile Network (PLMN); and (ii) the caller ID being associated with the local Public Land Mobile Network (PLMN).

19. The method of claim 18, wherein the call request is determined to be fraudulent only when:

(i) the caller ID is associated with the local Public Land Mobile Network (PLMN); and (ii) the current location information indicates that the caller device is attached to the local Public Land Mobile Network (PLMN).

* * * * *